United States Patent
Yoo et al.

(10) Patent No.: US 8,471,928 B2
(45) Date of Patent: Jun. 25, 2013

(54) APPARATUS AND METHOD FOR GENERATING HIGH ISO IMAGE

(75) Inventors: Young-Jin Yoo, Hwaseong-si (KR);
Won-Hee Choe, Hwaseong-si (KR);
Seong-Deok Lee, Suwon-si (KR);
Kang-Eui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/895,512

(22) Filed: Sep. 30, 2010

(65) Prior Publication Data
US 2011/0096201 A1    Apr. 28, 2011

(30) Foreign Application Priority Data
Oct. 23, 2009  (KR) ................ 10-2009-0101351

(51) Int. Cl.
*H04N 9/68* (2006.01)
(52) U.S. Cl.
USPC ................................. 348/235; 348/229.1
(58) Field of Classification Search
USPC .......................................... 348/235
See application file for complete search history.

(56) References Cited

U.S. PATENT DOCUMENTS

| | | | |
|---|---|---|---|
| 6,285,798 B1 * | 9/2001 | Lee | 382/260 |
| 6,731,815 B1 * | 5/2004 | Hu | 382/240 |
| 7,081,923 B1 * | 7/2006 | Noguchi | 348/256 |
| 7,421,120 B2 | 9/2008 | Kang | |
| 7,679,660 B2 | 3/2010 | Kobayashi | |
| 7,710,458 B2 | 5/2010 | Yuyama et al. | |
| 7,742,637 B2 | 6/2010 | Xiao et al. | |
| 7,773,135 B2 | 8/2010 | Watanabe | |
| 2003/0107682 A1 * | 6/2003 | Sono | 348/687 |
| 2004/0028271 A1 * | 2/2004 | Pollard et al. | 382/162 |
| 2005/0276510 A1 | 12/2005 | Bosco et al. | |
| 2006/0132642 A1 * | 6/2006 | Hosaka et al. | 348/370 |
| 2007/0009170 A1 * | 1/2007 | Lin et al. | 382/260 |
| 2007/0171310 A1 * | 7/2007 | Arici et al. | 348/687 |
| 2007/0206885 A1 | 9/2007 | Wen | |
| 2008/0089601 A1 * | 4/2008 | Ishiga | 382/263 |
| 2008/0118173 A1 * | 5/2008 | Maurer | 382/260 |
| 2008/0144962 A1 * | 6/2008 | Jung et al. | 382/274 |
| 2008/0166064 A1 * | 7/2008 | Fu | 382/276 |
| 2008/0175510 A1 * | 7/2008 | Matsushita | 382/260 |
| 2009/0161019 A1 * | 6/2009 | Jang | 348/663 |
| 2009/0184915 A1 * | 7/2009 | Tsai et al. | 345/102 |
| 2009/0220147 A1 * | 9/2009 | Batkilin et al. | 382/162 |
| 2009/0316019 A1 * | 12/2009 | Huang et al. | 348/223.1 |
| 2010/0079617 A1 * | 4/2010 | Kosaka | 348/229.1 |
| 2010/0225789 A1 * | 9/2010 | Gheorghe et al. | 348/241 |
| 2011/0038558 A1 * | 2/2011 | Lee et al. | 382/264 |

FOREIGN PATENT DOCUMENTS

| | | |
|---|---|---|
| JP | 2005-303802 | 10/2005 |
| JP | 2006-319827 | 11/2006 |
| JP | 2007-295260 | 11/2007 |

(Continued)

*Primary Examiner* — Roberto Velez
*Assistant Examiner* — Abdelaaziz Tissire
(74) *Attorney, Agent, or Firm* — NSIP Law

(57) ABSTRACT

An apparatus and method for generating a high ISO image are provided. To this end, an image may be divided into a first image having a low frequency component and a second image having a high frequency component. A brightness of the first image may be changed, and details of the second image may be restored. The first image having the changed brightness and the second image having the restored details may be synthesized.

23 Claims, 6 Drawing Sheets

FOREIGN PATENT DOCUMENTS

| | | |
|---|---|---|
| JP | 2007-306506 | 11/2007 |
| KR | 10-2005-0106160 | 11/2005 |
| KR | 10-2007-0026190 | 3/2007 |
| KR | 10-2008-0006605 | 1/2008 |

* cited by examiner $$\text{ISO SENSITIVITY EXPANSION VALUE}(E_{ISO}) = \frac{\text{DESIRED ISO SENSITIVITY}(D_{ISO})}{\text{SENSITIVITY}(S_{ISO})}$$

|   |   |   |   |   |
|---|---|---|---|---|
| 3 | 13 | 4 | 5 | ... |
| 4 | 7 | 3 | 3 | ... |
| 5 | 6 | 3 | 4 | ... |
| 5 | 5 | 4 | 4 | ... |
| ⋮ | ⋮ | ⋮ | ⋮ |   |

701

APPARATUS AND METHOD FOR GENERATING HIGH ISO IMAGE

CROSS-REFERENCE TO RELATED APPLICATION(S)

This application claims the benefit under 35 U.S.C. §119(a) of Korean Patent Application No. 10-2009-0101351, filed on Oct. 23, 2009, the entire disclosure of which is incorporated herein by reference for all purposes.

BACKGROUND

1. Field

The following description relates to a technology for expanding the ISO sensitivity of a camera.

2. Description of the Related Art

International Standard Organization (ISO) sensitivity represents a rated degree to which a camera responds to light. Digital cameras are able to adjust the ISO sensitivity depending on a user's setting and taking into consideration the surrounding environments. For example, in a low light photographing condition, a user may increase the ISO sensitivity value to achieve a sufficient shutter speed, thus avoiding issues traditionally associated with low light conditions such as camera shake. That is, an increase in ISO sensitivity may be useful to avoid using a long exposure time or slow shutter speed in low light photographing conditions.

Meanwhile, a digital camera may be provided with an image sensor which responds to light to output an electric signal. The image sensor discharges electric current in response to light but may generate a dark current due to sources other than light. Such a dark current results in noise in images.

One method of increasing the ISO sensitivity of digital camera may be achieved by amplifying output current of an image sensor. However, this also may cause dark current to be amplified, thereby amplifying noise in images. In addition, image sensors for use in digital cameras or camera phones have been developed to be more compact and to have a higher sensitivity. This may also cause a high level of noise.

The noise due to the increase in the ISO sensitivity may be removed through various noise removing methods. However, the increase in the ISO sensitivity also causes a degradation of image quality.

SUMMARY

In one general aspect, there is provided an apparatus for generating a high sensitivity image, the apparatus including: an image dividing unit configured to divide an image into a first image including a low frequency component and a second image including a high frequency component, a first image processing unit configured to change a brightness of the first image, a second image processing unit configured to restore details of the second image, and an image synthesizing unit configured to synthesize the first image including the changed brightness with the second image including the restored details.

The apparatus may further include that: the image dividing unit is further configured to apply a bilateral filter to the image, and a filter coefficient of the bilateral filter is determined based on at least one of: a scale of the image, a mean pixel value of the image, and a set International Standard Organization (ISO) sensitivity.

The apparatus may further include that the first image processing unit is further configured to: determine a brightness variance value of the first image based on an ISO sensitivity expansion value or a mean pixel value of the first image, and apply the determined brightness variance value to each pixel of the first image.

The apparatus may further include that the ISO sensitivity expansion value is determined based on the ratio of a desired ISO sensitivity to set ISO value.

The apparatus may further include that the brightness variance value is differently applied to each pixel of the first image, depending on a pixel value of each pixel of the first image.

The apparatus may further include that the first image processing unit is further configured to: change a brightness of the first image, and correct a color of the first image.

The apparatus may further include that the second image processing unit is further configured to: determine a gain control value of the second image based on an ISO sensitivity expansion value, and apply the determined gain control value to each pixel of the second image.

The apparatus may further include that the gain control value is differently applied to each pixel of the second image, depending on a statistic on surrounding pixels including each pixel of the second image.

The apparatus may further include that the second image processing unit is further configured to apply a high pass filter to the second image to which the gain control value has been applied.

The apparatus may further include a noise removing unit configured to: remove noise in the image, convert the image into a wavelet image, apply a spatial filter to one part of the wavelet image, and perform a wavelet coefficient shrinkage on another part of the wavelet image.

The apparatus may further include that: a filter coefficient of the spatial filter is determined based on a set ISO sensitivity, and the wavelet coefficient shrinkage is performed based on a noise profile including a set of functions, the set of functions representing a noise level corresponding to a mean pixel value of the image, according to ISO sensitivity.

In another general aspect, there is provided a method of generating a high sensitivity image, the method including: dividing an image into a first image including a low frequency component and a second image including a high frequency component, changing a brightness of the first image, restoring details of the second image, and synthesizing the first image including the changed brightness and the second image including restored details.

The method may further include that: the dividing of the image includes applying a bilateral filter to the image, and a filter coefficient of the bilateral filter is determined based on at least one of: a scale of the image, a mean pixel value of the image, and a set International Standard Organization (ISO) sensitivity.

The method may further include that the changing of brightness of the first image includes: determining a brightness variance value of the first image based on an ISO sensitivity expansion value or a mean pixel value of the first image, and applying the determined brightness variance value to each pixel of the first image.

The method may further include that the ISO sensitivity expansion value is determined based on the ratio of a desired ISO sensitivity to a set ISO value.

The method may further include that the brightness variance value is differently applied to each pixel of the first image, depending on a pixel value of each pixel of the first image.

The method may further include that the changing of brightness of the first image includes: changing a brightness of the first image, and performing color correction on the first image.

The method may further include that the restoring of the details of the second image includes: determining a gain control value of the second image based on an ISO sensitivity expansion value, and applying the determined gain control value to each pixel of the second image.

The method may further include that the gain control value is differently applied to each pixel of the second image, depending on a statistic on surrounding pixels including each pixel of the second image.

The method may further include that the restoring of the details of the second image includes applying a high pass filter to the second image to which the gain control value has been applied.

The method may further include: removing noise of the image by converting the image into a wavelet image, applying a spatial filter to one part of the wavelet image, and performing a wavelet coefficient shrinkage on another part of the wavelet image.

The method may further include that: a filter coefficient of the spatial filter is determined based on a set ISO sensitivity, and the wavelet coefficient shrinkage is performed based on a noise profile including a set of functions, the set of functions representing a noise level corresponding to a mean pixel value of the image, according to ISO sensitivity.

A computer-readable information storage medium may store a program for causing a computer to implement the method.

Other features and aspects may be apparent from the following detailed description, the drawings and the claims.

Figures 1, 2:
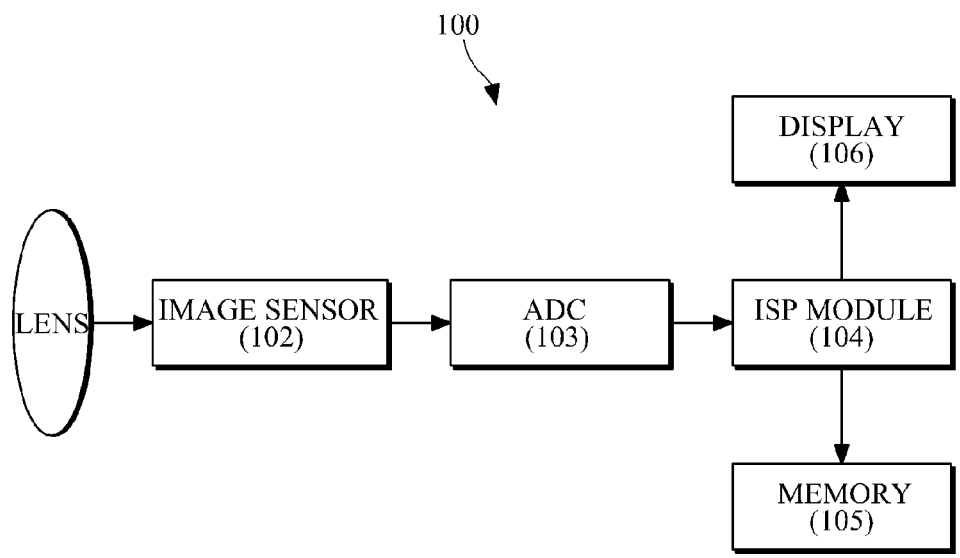
FIG. 1 is a diagram illustrating an example of a camera.
FIG. 2 is a diagram illustrating an example of an ISO expansion value ($E_{ISO}$).

Throughout the drawings and the detailed description, unless otherwise described, the same drawings reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and structures may be omitted for increased clarity and conciseness.

FIG. 1 illustrates an example of a camera.

As shown in FIG. 1, one example of a camera 100 includes a lens 101, an image sensor 102, an analog-digital converter (ADC) 103, an image signal processing (ISP) module 104, a memory 105, and a display 106.

Light reflected from photographed objects may be incident onto the image sensor 102 by passing through the lens 101. The image sensor 102 may sense the incident light and outputs an image signal corresponding to the sensed light.

The image sensor 102 may be implemented using a charge-coupled device (CCD) or a solid state imaging device such as a complementary metal-oxide semiconductor (CMOS), for example. The image sensor 102 has a particular characteristic of sensitivity with respect to light. International Standard Organization (ISO) sensitivity is a rated degree to which the image sensor 102 responds to light. Since the sensitivity of the image sensor 102 with respect to light may be changed within a small range, the ISO sensitivity may be controlled by increasing or reducing the electrical image signals output in response to light. The ISO sensitivity may be set by a user during photographing or may be automatically set by the camera 100 based on the amount of ambient light.

The image signal output from the image sensor 102 may be converted into a digital image signal through the ADC 103. The converted digital image signal may be input into the ISP module 104. The ISP module 104 may perform an image processing on the received image signal. The image signal passing through ISP module 104 may be stored in the memory 105 or may be displayed to the user through a display 106.

The image signal output from the image sensor 102 may have a high-bit depth data of ten (10) bits or more, and the level of signals may be linearly proportional to exposure time. However, since the ISP module 104 performs a non-linear processing on received signals, the image signal transmitted from the image sensor 102 to the ISP module 104 may lose its own linear characteristics and exhibit non-linear characteristics. In addition, the ISP module 104 may convert the received data into eight (8) bit data suitable for storing or displaying, so data loss may occur in the image signal of the image sensor, e.g., the data of 10 bits or more.

The configuration of an example of an apparatus of generating an image captured using a high ISO (also referred to as "high ISO image") allows the image signal of the image sensor 102 to be subject to pre-processing at a front part of the ISP module 104.

The example of the high ISO image generating apparatus may expand the maximum ISO sensitivity value provided by the camera 100. For example, when the maximum ISO sensitivity value of the camera 100 is 6400, the high ISO image generating apparatus may increase the maximum ISO sensitivity value into 12800 without changing other conditions. In such an example, the ISO sensitivity is increased two times, and the degree to which the sensitivity is expanded is referred to as an ISO expansion value.

FIG. 2 illustrates an example of an ISO expansion value ($E_{ISO}$).

As shown in FIG. 2, the ISO expansion value ($E_{ISO}$) may be defined as the ratio of a desired ISO sensitivity ($D_{ISO}$) with respect to a set ISO sensitivity ($S_{ISO}$). The set ISO sensitivity ($S_{ISO}$) may represent the maximum ISO sensitivity value provided in the camera 100. For example, when the ISO sensitivity provided by a camera is within 40 to 3200, the set ISO sensitivity ($S_{ISO}$) may be 3200. In this case, if a user wants to obtain ISO 6400 sensitivity, the ISO expansion value ($E_{ISO}$) is 2. Similarly, if a user wants to obtain ISO 12800, the ISO expansion value ($E_{ISO}$) is 4.

Although the ISO expansion value ($E_{ISO}$), in the example above, is defined as the ratio of the desired ISO sensitivity ($D_{ISO}$) with respect to the set ISO value ($S_{ISO}$), the ISO expansion value is not limited thereto. Another example of the ISO expansion value may be defined in various manners based on the desired ISO sensitivity ($D_{ISO}$) and the set ISO value ($S_{ISO}$). In addition, the ISO expansion value ($E_{ISO}$) may be calculated by receiving the desired ISO sensitivity ($D_{ISO}$) from a user or may be directly input by a user.

Figure 3:
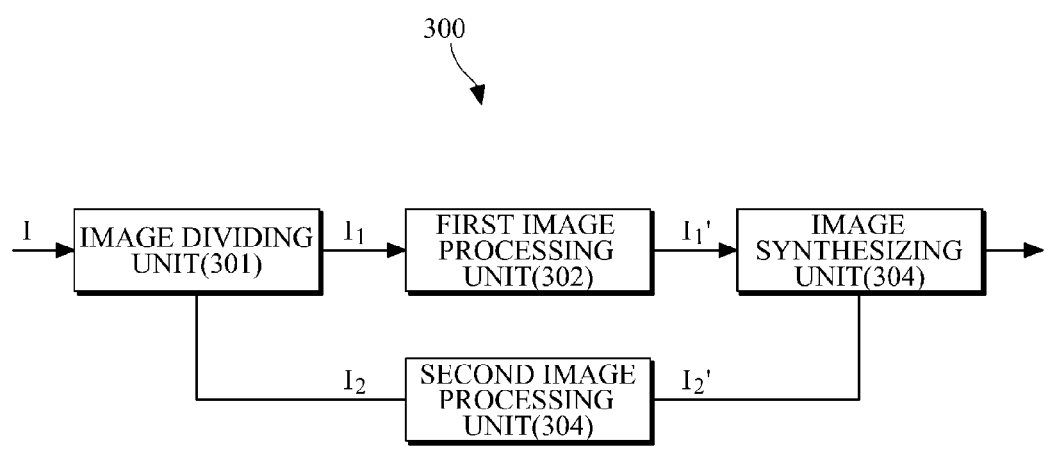
FIG. 3 is a diagram illustrating one example of an apparatus for generating a high ISO image.

FIG. 3 illustrates one example of an apparatus for generating a high ISO image.

As shown in FIG. 3, the high ISO image generating apparatus 300 includes an image dividing unit 301, a first image processing unit 302, a second image processing unit 303 and an image synthesizing unit 304.

In order to prevent or limit the images I input to the image dividing unit 301 from being influenced by the non-linear characteristics of the ISP module 104, the images I may be provided as sub-images for each channel of Bayer pattern data, in which the Bayer pattern data corresponds to an image before inputting into the ISP module 104.

The image dividing unit 301 may divide the image I into a first image $I_1$ having a low frequency component and a second image $I_2$ having a high frequency component. For example, the first image $I_1$ may be a base layer having a large number of low frequency components and the second image $I_2$ may be a texture layer having a large number of high frequency components.

The image dividing unit 301 may divide the image I into the first image $I_1$ and the second image $I_2$ using various filtering schemes. For example, the image dividing unit 301 may apply a bilateral filter to the image I. The bilateral filter filters the input signal by doing convolution between a predetermined Gaussian function with the input signal. A filter coefficient of the bilateral filter may be determined based on at least one of the scale of the image I, the mean pixel value of the image I and the set ISO sensitivity $S_{ISO}$. For example, a geometric distance width corresponding to a first standard deviation of the Gaussian function may be obtained using the scale of the image I, a photometric distance width corresponding to a second standard deviation of the Gaussian function may be obtained using the scale of the image I, the mean pixel value of the image I and the set ISO sensitivity $S_{ISO}$, and the filter coefficient of the bilateral filter may be obtained based on the obtained geometric distance width and the photometric distance width.

If the image dividing unit 301 applies the bilateral filter to the image I, the first image $I_1$ having a low frequency component may be output. The image dividing unit 301 may output the second image $I_2$ having a high frequency component by calculating the ratio of the output first image $I_1$ with respect to the image I. Alternatively, the image dividing unit 301 may output the second image $I_2$ by subtracting the first image $I_1$ from the image I. The first image $I_1$ and the second image $I_2$ output from the image dividing unit 301 may be input into the first image processing unit 302 and the second image processing unit 303, respectively.

The first image processing unit 302 may change the brightness of the first image $I_1$ by applying a predetermined brightness variance value to each pixel value of the first image $I_1$.

Each pixel value may be represented by a brightness level, and the brightness variance value may be determined based on the ISO expansion value $E_{ISO}$ and the mean pixel value of the image I. The determined brightness variance value may be applied to each pixel of the first image $I_1$. The brightness value may be differently applied to each pixel depending on each pixel value of each pixel the first image $I_1$. For example, if the ISO expansion value $E_{ISO}$ is 3, the brightness variance value may have a value within a range of 1 to 3, and the brightness variance value may be selected as one value of 1 to 3 based on the mean pixel value of the image I. In addition, the selected brightness variance value may be differently applied to each pixel of the first image $I_1$ depending on the pixel value of each pixel. A method of applying the brightness variance value to each pixel of the first image $I_1$ is further described below.

In addition to changing the brightness of the first image $I_1$, the first image processing unit may also perform a matrix based color correction on the first image $I_1$ having a changed brightness.

The second image processing unit 303 may enhance the high frequency component of the second image $I_2$ by applying a predetermined gain control value to the second image $I_2$ and applying a high-pass filter to the second image $I_2$ to which the predetermined gain control value has been applied.

The gain control value may be a predetermined constant value or may depend on the ISO sensitivity expansion value $E_{ISO}$. For example, if the ISO sensitivity expansion value $E_{ISO}$ is 2, the gain control value may also be determined as 2. The determined gain control value is applied to each pixel of the second image $I_2$, in which the gain control value is differently applied to each pixel of the second image $I_2$, depending on a statistic on surrounding pixels including each pixel of the second image $I_2$. The statistic is obtained by setting a window including several pixels of the second image $I_2$ and using the mean pixel value of the pixels included in the window. When applying the gain control value to a pixel provided in the center of the window, the mean pixel value of the pixels is compared with a predetermined threshold value and the gain control value to be applied is slightly increased or decreased depending on the comparison result. One example of a method of applying the gain control value to each pixel of the second image $I_2$ is described further below.

After the gain of each pixel of the second image $I_2$ has been controlled, a high-pass filter may be applied to the second image $I_2$, to thereby restore the texture of the second image $I_2$. A filter coefficient of the high-pass filter may be determined based on the set ISO sensitivity $S_{ISO}$.

The image synthesizing unit 304 synthesizes a first image $I_1'$ having a changed brightness with a second image $I_2'$ having restored details. For example, if the image dividing unit 301 outputs a second image $I_2$ depending on the ratio of the first image $I_1$ with respect to the input image I, the image synthesizing unit 304 multiplies the first image $I_1'$ having the changed brightness by the second image $I_2'$ having the restored details. If the image dividing unit 301 outputs a second image $I_2$ by subtracting the first image $I_1$ from the input image I, the image synthesizing unit 304 adds the first image $I_1'$ having the changed brightness to the second image $I_2'$ having the restored details.

In this manner, the received image is divided depending on frequency, a brightness change and detail restoration are performed on the divided images, respectively, and the image subject to the brightness change is synthesized with the image subject to the detail restoration. Accordingly, a high ISO image above an ISO sensitivity limit of a particular camera may be obtained.

Figure 4:
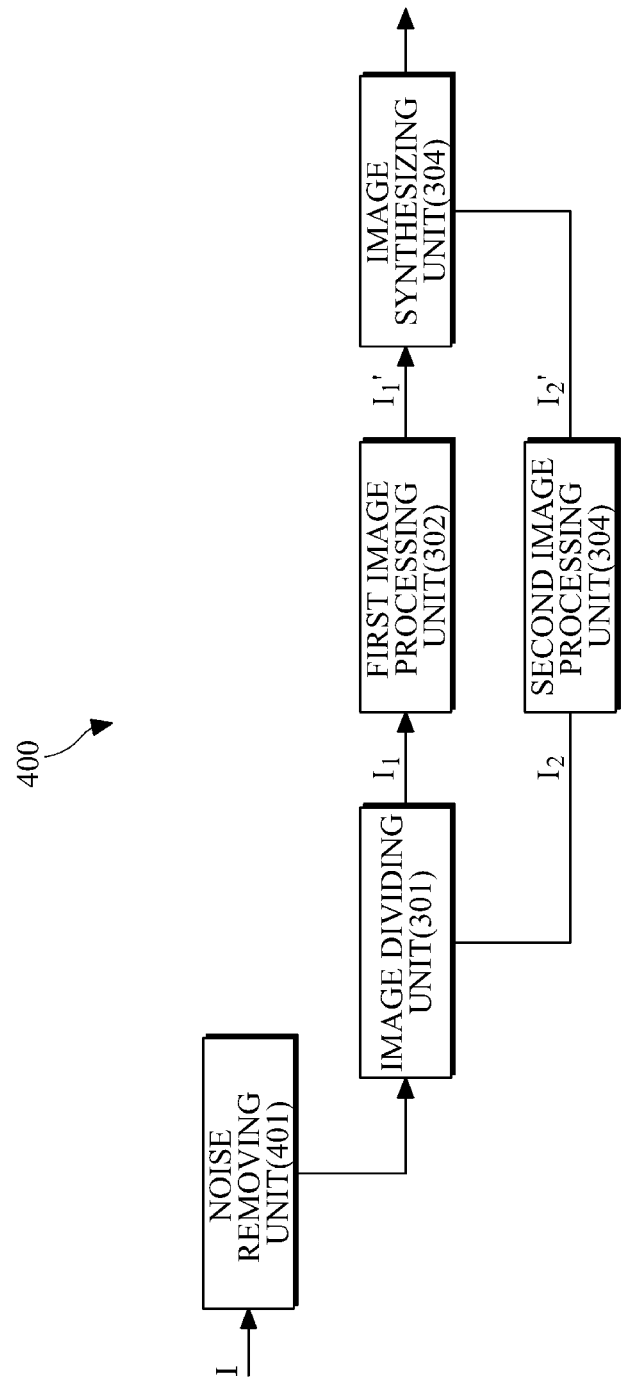
FIG. 4 is a diagram illustrating another example of an apparatus for generating a high ISO image.

FIG. 4 illustrates another example of an apparatus for generating a high ISO image.

The example illustrated in FIG. 4 is similar to the example of FIG. 3, except that the example of FIG. 4 includes a noise removing unit 401. That is, the high ISO image generating apparatus 400 further includes a noise removing unit 401 in addition to the image dividing unit 301, the first image processing unit 302, the second image processing unit 303 and the image synthesizing unit 304. In FIG. 4, the image dividing unit 301, the first image processing unit 302, the second image processing unit 303 and the image synthesizing unit 304 may be identical to those of shown in FIG. 3. Accordingly, the description of the features having the same reference numerals is omitted.

The noise removing unit 401 decomposes the input image I into images for a plurality of different sub-bands by performing an N-level wavelet transformation on the input image I.

According to the wavelet transformation, a given signal may be decomposed corresponding to a plurality of different frequency bands through two or more filters. In the case of a wavelet transformation on a two-dimensional image, the frequency decomposition process may be performed for a horizontal direction and a vertical direction. The frequency decomposition may be performed by passing the image signal through a high-pass filter or a low-pass filter. For example, when a predetermined image is subject to a wavelet transformation, the image is decomposed into sub-bands corresponding to HH, HL, LH, and LL. H represents a high frequency component and L represents a low frequency component. For example, HH is a result produced by passing a row of the image and a column of the image through a high-pass filter. In this case, LL contains approximation information and HH, HL and LH contain detailed information. Such a decomposition process may be performed several times. For example, a 3-level wavelet transformation represents that the decomposition process is repeated three times. HL(2) represents a sub-band which is produced by performing a wavelet transformation on LL(1) sub-band which has been subject to a decomposition process. That is, the HL(2) is a sub-band produced by processing a row of the LL(1) sub-band using a high-pass filter and processing a column of the LL(1) sub-band with a low-pass filter.

The noise removing unit 401 may apply a spatial filter to an LL sub-band providing approximation information and performs a wavelet coefficient shrinkage on HH, HL and LH sub-bands providing detailed information. In this case, a filter coefficient of the spatial filter may be determined based on a set ISO sensitivity $S_{ISO}$ or the scale of an image I. The wavelet coefficient shrinkage may be performed based on a noise profile which is a set of functions, which represent noise levels corresponding to a mean pixel value of the image, according to ISO sensitivity.

Figure 5:
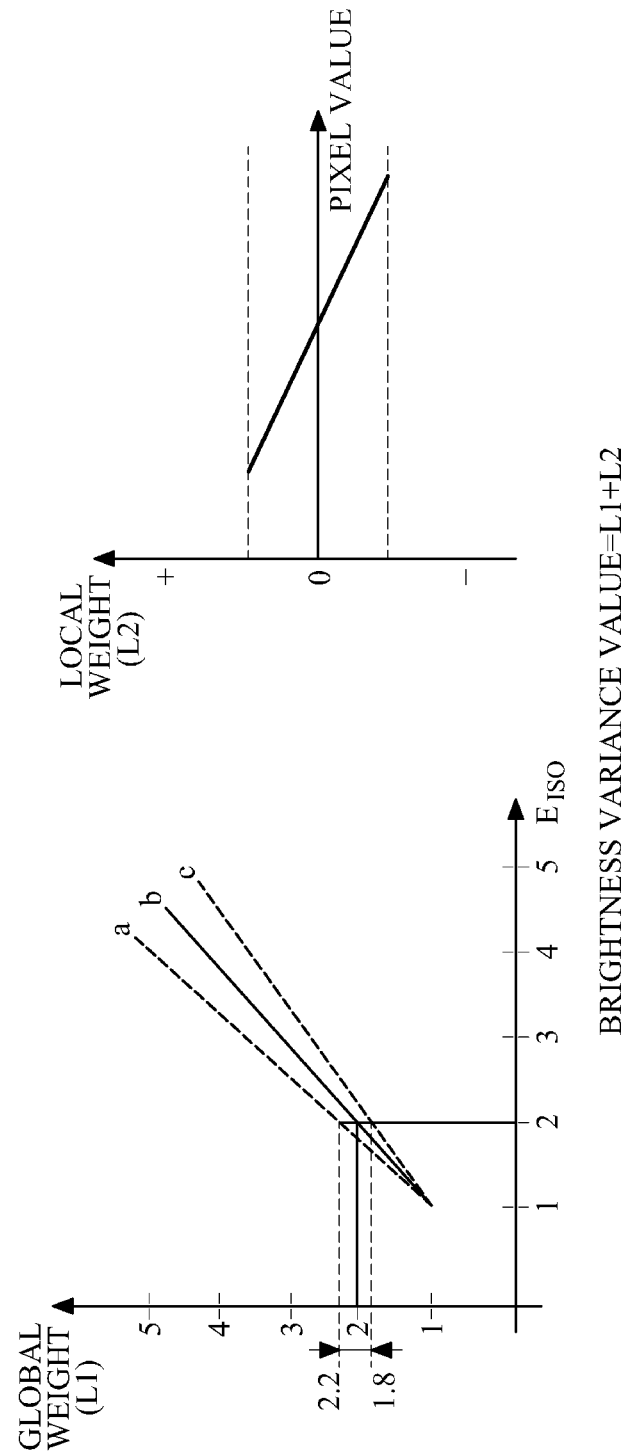
FIG. 5 is a graph illustrating an example of brightness variation values.

FIG. 5 illustrates an example of brightness variation.

Referring to FIG. 5, the first image processing unit 302 may calculate a global weight L1. The global weight L1 may vary according to the ISO expansion value $E_{ISO}$ and the mean pixel value of the image I or the mean brightness of the image I. As shown in FIG. 2, when increasing the ISO sensitivity up to 12800 in a camera having a maximum ISO value of 6400, the ISO expansion value $E_{ISO}$ is 2. In the graph shown on the left of FIG. 5, if the ISO expansion value $E_{ISO}$ is 2, the global weight L1 may have a value within 1.8 to 2.2. The slope of each line corresponds to the mean pixel value or the mean brightness. If the mean pixel value of the image I is b, the global weight L1 is determined as 2.

After that, the first image processing unit 302 calculates a local weight L2. The local weight L2 varies according to each pixel value of the first image $I_1$. For example, in the graph shown on the right of FIG. 5, a predetermined local weight L2 may be determined based on each pixel value of the first image $I_1$.

A brightness variance value may be obtained as the sum of the global weight L1 and the local weight L2. Accordingly, when applying the brightness variance value to each pixel of the first image $I_1$, the first image processing unit 302 obtains the global weight L1 and increases or decreases the obtained global weigh L1 by the local weight L2 which differs from pixel to pixel, so that a brightness variance value depending on each pixel can be applied to each pixel.

Figure 6:
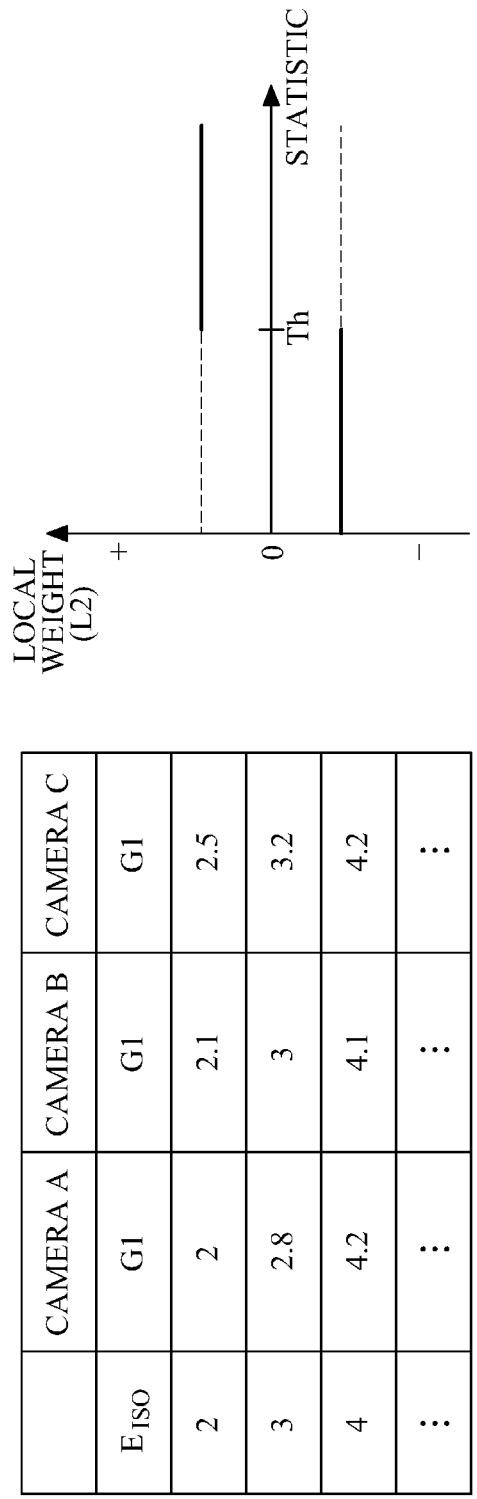
FIG. 6 is a diagram illustrating an example of gain control values.
Figures 7, 8:
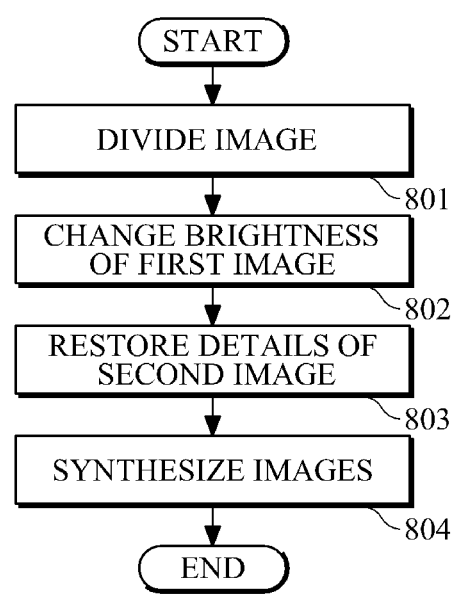
FIG. 7 is a diagram illustrating an example of a window.
FIG. 8 is a flow chart illustrating an example of a method of generating a high ISO image.

FIG. 6 illustrates examples of gain control values, and FIG. 7 illustrates pixels of an example of a second image $I_2$.

Referring to FIGS. 6 and 7, the second image processing unit 303 may calculate a global weigh G1. The global weight G1 may vary according the ISO expansion value $E_{ISO}$. For example, when increasing the ISO sensitivity up to 12800 in cameras A and B each having a maximum ISO 6400, the ISO expansion value $E_{ISO}$ is 2. If the ISO expansion value $E_{ISO}$ is 2, the global weight G1 of the camera A is 2 and the global weight G1 of the camera B is 2.1. In this manner, the global weight G1 for each camera is determined based on the ISO expansion value $E_{ISO}$.

After that, the second image processing unit 303 may calculate a local weight G2. The local weight G2 may vary depending on a statistic on pixels included within a predetermined window of the second image $I_2$. As shown in FIG. 7, the mean pixel value of pixels included in a 3×3 window 701 may be used as the statistic on the pixels of the window 701. Referring to FIG. 6, the local weight G2 may be determined based on a comparison result between the calculated statistic and a predetermined threshold value.

A gain control value is the sum of the global weight G1 and the local weight G2. Accordingly, when applying the gain control value to each pixel of the second image $I_2$, the second image processing unit 303 may obtain the global weight L1 and increase or decrease the obtained global weigh L1 by the local weight L2 which differs from pixel to pixel, so that the gain control value depending on each pixel is applied to each pixel. In this case, each pixel may represent a pixel provided in the center of the window 701 of FIG. 7.

After gains of the pixels of the second image $I_2$ have been adjusted, the second image processing unit 303 may perform a high-pass filtering while moving a kernel corresponding to the window 701. In this case, a coefficient of the kernel may be adaptively changed depending on a set ISO sensitivity $S_{ISO}$.

FIG. 8 illustrates an example of a method of generating high ISO image.

As shown in FIG. 8, and with reference to FIGS. 3 and 4, at operation 801, an input image I is divided into a first image $I_1$ having a high frequency component and a second image $I_2$ having a low frequency component. For example, the image dividing unit 301 may divide the image I by applying a bilateral filter to the input image I.

In addition, before the dividing of the image, noise may be removed from the image I. The method of removing noise may be implemented by performing a wavelet transformation on the image I to produce sub bands and performing a spatial filtering or a wavelet coefficient shrinkage on each sub band.

After the image I has been divided into the first image $I_1$ and the second image $I_2$, the first image processing unit 302 changes the brightness of the first image $I_1$ at operation 802. For example, the first image processing unit 302 may apply a brightness variance value to each pixel of the first image $I_1$ as described with reference to FIG. 5.

Alternatively, after the brightness of the first image $I_1$ has been changed, a matrix based color correction and a matrix based color interpolation may be performed on the first image $I_1$.

Meanwhile, at operation 803, the second image processing unit 303 restores details of the second image $I_2$. For example, the second image processing unit 303 applies a gain control value to each pixel of the second image $I_2$ and performs a high-pass filtering on the second image $I_2$ as described above with reference to FIGS. 6 and 7.

At operation 804, the first image $I_1'$ having a changed brightness is synthesized with the second image $I_2'$ having restored details. For example, the image synthesizing unit 304 may perform the synthesize process by adding the first image $I_1'$ to the second image $I_2'$ or multiplies the first image $I_1'$ by the second image $I_2'$.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to generate a high sensitivity image, the apparatus comprising:
    an image dividing unit configured to divide an image into a first image comprising a low frequency component and a second image comprising a high frequency component;
    a first image processing unit configured to
    determine a brightness variance value of the first image based on an ISO sensitivity expansion value and a mean pixel value of the first image, and
    apply the determined brightness variance value to each pixel of the first image to change a brightness of the first image;
    a second image processing unit configured to restore details of the second image; and
    an image synthesizing unit configured to synthesize the first image comprising the changed brightness with the second image comprising the restored details.

2. The apparatus of claim 1, wherein:
    the image dividing unit is further configured to apply a bilateral filter to the image; and
    a filter coefficient of the bilateral filter is determined based on a scale of the image, or a mean pixel value of the image, or a set ISO sensitivity, or any combination thereof.

3. The apparatus of claim 1, wherein the ISO sensitivity expansion value is determined based on a ratio of a desired ISO sensitivity to a set ISO sensitivity.

4. The apparatus of claim 1, wherein the first image processing unit is further configured to:
    determine the brightness variance value further based on a pixel value of each pixel of the first image.

5. The apparatus of claim 1, wherein the first image processing unit is further configured to:
    correct a color of the first image.

6. The apparatus of claim 1, wherein the second image processing unit is further configured to:
    determine a gain control value of the second image based on the ISO sensitivity expansion value; and
    apply the determined gain control value to each pixel of the second image.

7. The apparatus of claim 6, wherein the second image processing unit is further configured to:
    determine the gain control value further based on a statistic on pixels of the second image.

8. The apparatus of claim 6, wherein the second image processing unit is further configured to:
    apply a high pass filter to the second image to which the gain control value has been applied.

9. The apparatus of claim 1, further comprising a noise removing unit configured to:
    convert the image into a wavelet image to remove noise in the image;
    apply a spatial filter to one part of the wavelet image; and
    perform a wavelet coefficient shrinkage on another part of the wavelet image.

10. The apparatus of claim 9, wherein:
    a filter coefficient of the spatial filter is determined based on a set ISO sensitivity; and the wavelet coefficient shrinkage is performed based on a noise profile comprising a set of functions, the set of functions representing noise levels corresponding to a mean pixel value of the image, according to an ISO sensitivity.

11. A method of generating a high sensitivity image, the method comprising:
dividing, by a processor, an image into a first image comprising a low frequency component and a second image comprising a high frequency component;
determining a brightness variance value of the first image based on an ISO sensitivity expansion value and a mean pixel value of the first image;
applying the determined brightness variance value to each pixel of the first image to change a brightness of the first image;
restoring details of the second image; and
synthesizing the first image comprising the changed brightness and the second image comprising the restored details.

12. The method of claim 11, wherein:
the dividing of the image comprises applying a bilateral filter to the image; and
a filter coefficient of the bilateral filter is determined based on a scale of the image, or a mean pixel value of the image, or a set ISO sensitivity, or any combination thereof.

13. The method of claim 11, wherein the ISO sensitivity expansion value is determined based on a ratio of a desired ISO sensitivity to a set ISO sensitivity.

14. The method of claim 11, wherein the determining of the brightness variance value comprises:
determining the brightness variance value further based on a pixel value of each pixel of the first image.

15. The method of claim 11, wherein the applying of the brightness variance value comprises:
correcting a color of the first image.

16. The method of claim 11, wherein the restoring of the details of comprises:
determining a gain control value of the second image based on the ISO sensitivity expansion value; and
applying the determined gain control value to each pixel of the second image.

17. The method of claim 16, wherein the determining of the gain control value comprises:
determining the gain control value further based on a statistic on pixels of the second image.

18. The method of claim 16, wherein the restoring of the details of the second image comprises:
applying a high pass filter to the second image to which the gain control value has been applied.

19. The method of claim 11, further comprising:
converting the image into a wavelet image to remove noise in the image;
applying a spatial filter to one part of the wavelet image; and
performing a wavelet coefficient shrinkage on another part of the wavelet image.

20. The method of claim 19, wherein:
a filter coefficient of the spatial filter is determined based on a set ISO sensitivity; and
the wavelet coefficient shrinkage is performed based on a noise profile comprising a set of functions, the set of functions representing noise levels corresponding to a mean pixel value of the image, according to an ISO sensitivity.

21. A non-transitory computer-readable storage medium storing a program comprising instructions to cause a computer to implement the method of claim 11.

22. The apparatus of claim 1, wherein the ISO sensitivity expansion value is determined based on a ratio of a desired ISO sensitivity desired by a user, over a maximum ISO sensitivity provided in a camera.

23. The apparatus of claim 6, wherein the second image processing unit is further configured to:
determine the gain control value further based on a mean pixel value of pixels included in a predetermined window of the second image, and a predetermined threshold.

* * * * *